US009135247B2

(12) United States Patent  
Li et al.

(10) Patent No.: US 9,135,247 B2  
(45) Date of Patent: Sep. 15, 2015

(54) WEB CONTENT CORRECTION AND WEB CONTENT CORRECTION SERVICE

(75) Inventors: Juan Li, Shanghai (CN); Xin Wen Qi, Shanghai (CN); Fang Rui Shu, Shanghai (CN); Mei Yang, Shanghai (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1372 days.

(21) Appl. No.: 12/484,395

(22) Filed: Jun. 15, 2009

(65) Prior Publication Data

US 2009/0327865 A1 Dec. 31, 2009

(30) Foreign Application Priority Data

Jun. 30, 2008 (CN) .......................... 2008 1 0127447

(51) Int. Cl.
*G06F 17/00* (2006.01)
*G06F 17/30* (2006.01)
*G06F 17/27* (2006.01)

(52) U.S. Cl.
CPC .............. *G06F 17/30* (2013.01); *G06F 17/273* (2013.01); *G06F 17/3089* (2013.01)

(58) Field of Classification Search
CPC .... G60F 17/30; G60F 17/273; G60F 17/3089
USPC .................. 715/234, 227, 255, 200, 235, 257
See application file for complete search history.

(56) References Cited

U.S. PATENT DOCUMENTS

| | | | |
|---|---|---|---|
| 7,149,980 B1* | 12/2006 | Nelson et al. ................. | 715/764 |
| 7,779,353 B2* | 8/2010 | Grigoriu et al. .............. | 715/255 |
| 8,006,180 B2* | 8/2011 | Tunning et al. ............... | 715/257 |
| 2002/0133514 A1* | 9/2002 | Bates et al. ................. | 707/501.1 |
| 2004/0075686 A1* | 4/2004 | Watler et al. ................. | 345/749 |
| 2004/0205545 A1* | 10/2004 | Bargeron et al. ............. | 715/512 |
| 2005/0125716 A1* | 6/2005 | Cragun et al. ................ | 715/512 |
| 2006/0282762 A1* | 12/2006 | Diamond et al. ............. | 715/511 |
| 2007/0208994 A1* | 9/2007 | Reddel et al. ................ | 715/512 |
| 2008/0168073 A1* | 7/2008 | Siegel et al. ................. | 707/100 |
| 2008/0281578 A1* | 11/2008 | Kumaran et al. ............. | 704/2 |
| 2008/0320343 A1* | 12/2008 | Eickmeyer et al. ........... | 714/57 |

OTHER PUBLICATIONS

Valeria Cardellini, Philip S. Yu, Yun-Wu Huang, Collaborative Proxy System for Distributed Web Content Transcoding, Article, 2000, pp. 520-527, Association for Computing Machinery, New York, NY, USA.

* cited by examiner

*Primary Examiner* — Thu Huynh
(74) *Attorney, Agent, or Firm* — Lee Law, PLLC; Christopher B. Lee (57) ABSTRACT

A method includes determining a location of erroneous content in a web page in response to a user's request for correcting the erroneous content in the web page; receiving the user's input of correction content for the erroneous content; and submitting correction information to a correction service provider including the location of the erroneous content and the correction content. An alternative method includes receiving correction information submitted by a user for erroneous content in a web page, the correction information including a location of the erroneous content and correction content; storing the received correction information; and retrieving the correction information and sending the correction information to the user in response to the user's request for visiting the web page.

24 Claims, 8 Drawing Sheets

---

Answers to SFR Questions

Noah asks: "What is the speed of light?"

The speed of light is 3 x 10 8 (or 300 per second (or 670 million miles per get a feel for, so think of it this way... the sun, and started out when you we same time you reached the sun! But i just over 8 minutes! Now that's fast!

E.T. asks: "Do you handle mercury

No, we do not use mercury in the Tes

[JavaScript Application]   ✕

Original Text: 3 x 10 8
Start position in the current DOM element: 22
End position in the current DOM element: 30
ID of the element (if any):
Name of the element (if any):
Sequential ID in relation to name (if any):0
Tag name of the element: P
Sequential ID in relation to tag name: 2

Answers to SFR Questions

Noah asks: "What is the speed of light?"

The speed of light is 3 x 10 8 (or 300 million) meters per second, or over 186, 000 miles per second (or 670 million miles per hour)! Now, that's just a number, which is hard to get a feel for, so think of it this way... if you flew in a commercial airliner from the earth to the sun, and started out when you were born, you'd graduate from high school about the same time you reached the sun! But if you traveled at the speed of light, you'd be there in just over 8 minutes! Now that's fast!

E.T. asks: "Do you handle mercury?"

No, we do not use mercury in the Test Lab. Mercury is hazardous substance, and while

Answers to SFR Questions

Noah asks: "What is the speed of light?"

The speed of light is $3 \times 10.8$ (or 300 million) meters per second, or over 186,000 miles per second (or 670 million miles $3 \times 10^{-8}$ Now, that's just a number, which is hard to get a feel for, so think of it this way.... If you flew in a commercial airliner from the earth to the sun, and started out when you were born, you'd graduate from high school about the same time you reached the sun! But if you traveled at the speed of light, you'd be there in just over 8 minutes! Now that's fast!

E.T. asks: "Do you handle mercury?"

No, we do not use mercury in the Test Lab. Mercury is hazardous substance, and while

Figure 9

WEB CONTENT CORRECTION AND WEB CONTENT CORRECTION SERVICE

RELATED APPLICATIONS

This application claims priority to and claims the benefit of Chinese Patent Application Serial No. 200810127447.X titled "Web Content Correction Method and Device, Web Content Correction Service Method and Apparatus," which was filed in the Chinese Patent Office on Jun. 30, 2008, and which is incorporated herein by reference in its entirety.

BACKGROUND

The present invention relates to the field of information processing. More specifically, the present invention relates to a method and device for correcting the erroneous contents in web pages, an apparatus for providing web content correction service and the method thereof, and a computer program product.

With the development of information search technology, Internet search service providers like Google® and Yahoo® have provided web users with better and better search experience. Users can quickly find their interested information with a few clicks. Due to this convenience, users are becoming increasingly dependent on the web to obtain information, and at the same time, more institutions have been promoted to publish information on the web to attract users. Since the web has become one of the major sources for people to get knowledge, it is an important issue to improve the correctness of the contents published on the web so as to prevent the public from being misled by erroneous contents.

Generally speaking, there are two ways to publish information (contents) on the web: centralized content publication and distributed content publication. In centralized content publication, the website owner has full control over the web content, including the creation, update, and deletion of web content. Typical examples of centralized websites include Sohu, Sina, etc. Due to the limited knowledge of the website owner, the contents published in this way will likely contain errors. If these errors cannot be corrected in a timely manner, they will adversely affect the users who are browsing the web content.

In an existing method to deal with this problem, the website owner maintains a feedback channel for the users to report the erroneous content, and corrects the erroneous content on the web page according to the users' feedback. However, this method is not satisfactory due to the following drawbacks. First, there is normally a delay from when a user submits feedback until the website owner processes the feedback. During the delay period, the erroneous content remains uncorrected and thus the above-mentioned problem still exists. Second, whether to adopt the user's feedback to correct the web content depends on the website owner's judgment. The website owner may make a wrong decision due to the limit of his/her knowledge as stated previously. Third, if a user wants to correct the erroneous contents on different websites, he/she will need to submit feedback to the owners of each of these websites, respectively. This requires that the user be familiar with the feedback mechanisms of various websites, which may discourage the user from suggesting corrections to the errors. What is worse, many website owners never update the web contents after the publication thereof. For these websites, the users will have no way to correct the erroneous contents in the web pages.

On the other hand, in distributed content publication, the public has control over the creation, update, and deletion of the web contents. A typical example of distributed content publication is Wikipedia. If a user finds erroneous web content on the website, he/she can directly correct it. However, the centralized websites are much more than the distributed websites in number and will not be replaced by the latter in quite a long time. Therefore, it is impossible to use the error correction mechanism of the distributed websites to solve the problem of the centralized websites. Also, due to the limited knowledge of the users who correct the web content, the corrections he/she makes may also be erroneous. Moreover, for distributed websites, the same problem exists where the user is required to get familiar with the error correction mechanisms of different websites and thus inconvenience will be caused to the user.

SUMMARY

The present subject matter provides a mechanism for enabling users to correct the erroneous contents on various web pages in an efficient, convenient, and uniform way.

According to the first aspect of the present subject matter, there is provided a method for correcting erroneous content in a web page, including: determining, at a web client device, a location of the erroneous content in the web page in response to a user's request for correcting the erroneous content in the web page; receiving, via an input/output (I/O) device, the user's input of correction content for the erroneous content; and submitting, via a network interface, correction information to a correction service provider which includes the location of the erroneous content and the correction content.

According to the second aspect of the present subject matter, there is provided a device for correcting erroneous content in a web page, including: a locating module configured to determine a location of the erroneous content in the web page in response to a user's request for correcting the erroneous content in the web page; a correcting module configured to receive the user's input of correction content for the erroneous content; and a submitting module configured to submit correction information to a correction service provider including the location of the erroneous content and the correction content.

According to the third aspect of the present subject matter, there is provided a method for providing web content correction service, including: receiving, at a web content correction server, correction information submitted by a user for erroneous content in a web page, the correction information including a location of the erroneous content and correction content; storing, within a memory, the received correction information; and retrieving the correction information from the memory and sending the correction information to the user, via a network interface, in response to the user's request for visiting the web page.

According to the fourth aspect of the present subject matter, there is provided an apparatus for providing web content correction service, including: a receiving module configured to receive correction information submitted by a user for the erroneous content in a web page, the correction information including a location of the erroneous content and correction content; a storing module configured to store the received correction information; and a retrieving module configured to retrieve the correction information and send the correction information to the user in response to the user's request for visiting the web page.

According to a further aspect of the present subject matter, there is provided a computer program product which, when being executed on a computer, implements the above-mentioned web content correction method and the method for providing web content correction service.

Based upon the present subject matter, an ordinary web user may conveniently correct the erroneous contents on various web pages and other users may see the correction without significant delay. Likewise, the web user may also see the corrections made by other users to the erroneous contents on various web pages. As a result, there is provided a web content correction mechanism with efficiency, convenience, and objectiveness.

DETAILED DESCRIPTION

Figure 1:
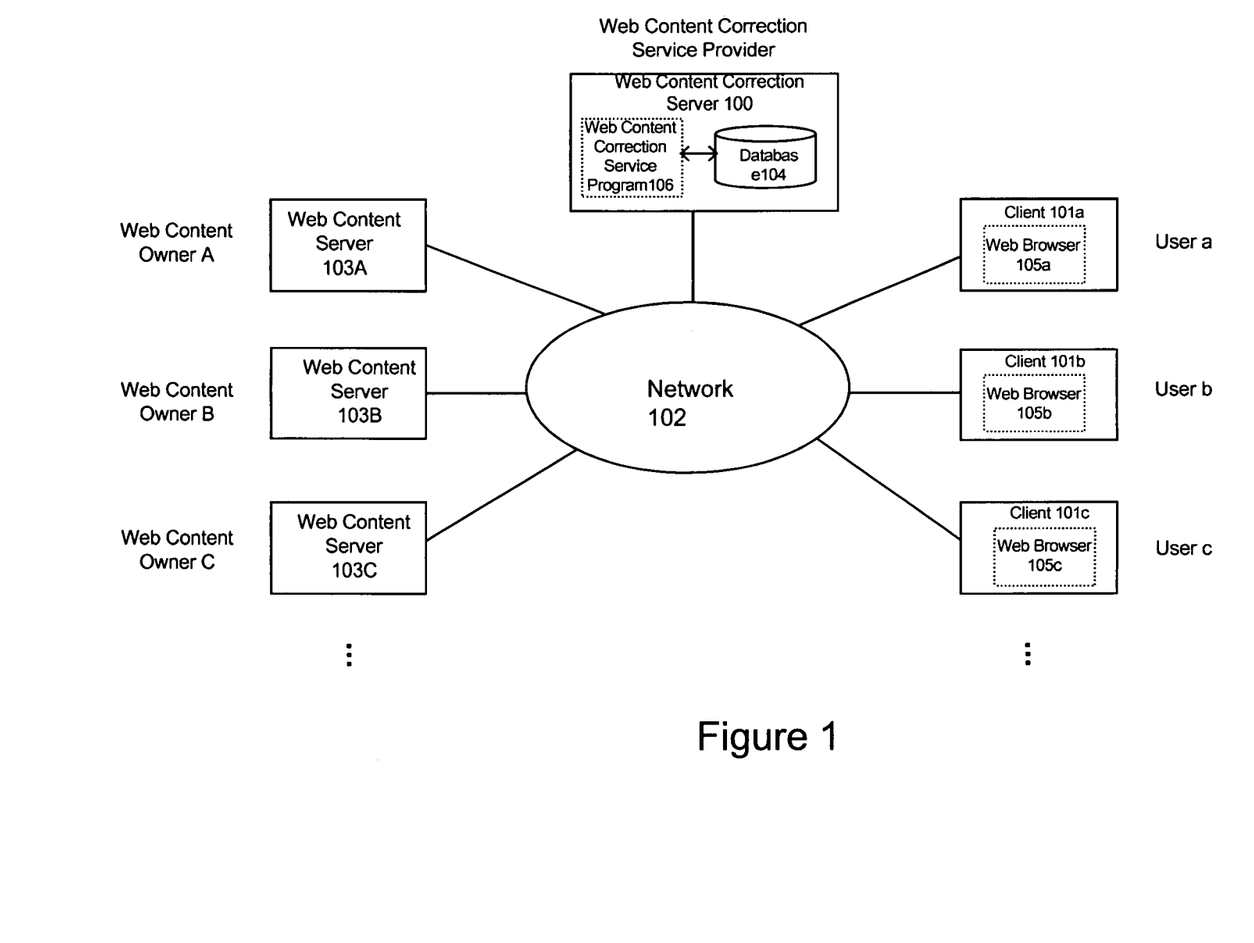
FIG. 1 illustrates an example of a network environment in which a web content correction method according to one embodiment of the present subject matter is implemented.

FIG. 1 illustrates an example of a network environment in which a web content correction method according to one embodiment of the present subject matter is implemented. It is understood that the correction processes for centralized content and distributed content based upon the present subject matter are substantially the same. As such, for the ease of description purposes and representativeness, the present embodiment is described in conjunction with a centralized website. As shown in FIG. 1, a plurality of web content servers 103A, 103B, and 103C (also indicated generally by "103" hereinafter) located at web content owners A, B, and C, respectively, are coupled to a network 102, such as the Internet. A plurality of users a, b, and c may access the web contents provided by the web content servers 103 through web browser software 105a, 105b, and 105c (also indicated generally by "105" hereinafter) installed on clients 101a, 101b, and 101c (also indicated generally by "101" hereinafter). FIG. 1 also shows a web content correction service provider, which is also abbreviated as "correction service provider" hereinafter for sake of simplicity. The correction service provider includes a web content correction server 100 (also abbreviated as "correction server" or "sever" hereinafter), for providing the users and the web content owners with the web content correction service.

Client 101 may be implemented by a general purpose computer. The general purpose computer (not shown) typically includes: a CPU, a hard drive, a video adapter for driving a display, and a network interface coupled to a system bus; various I/O devices coupled via an I/O interface to an I/O bus, including a keyboard, a mouse, ROM, etc.; and system memory coupled to the system bus, storing therein an operating system, and various applications including a browser application which may receive/send messages from/to the network 102 by using Hyper Text Transfer Protocol (HTTP).

Similarly, the web content correction server 100 may be implemented by a computer apparatus. Particularly, the computer apparatus includes a database 104 implemented by a mass storage.

The software part for implementing the web content correction method/system of the present invention may be implemented as a plug-in (also referred to as "correction plug-in" or "plug-in") in the web browser 105 at the client 101. Web content correction and rendering of corrected web content may both be implemented in the web browser 105. A user may install a plug-in based upon the present subject matter in a common browser. Therefore, the user may employ the method of the present subject matter by using a familiar browser without having to learn a new application.

On the other hand, at the side of the correction server 100, the software part of the present invention may be implemented as a web content correction service program 106.

The plug-in in the browser 105 and the web content correction service program 106 include various functional modules for carrying out the various steps of the web content correction method of the present subject matter.

Figure 2:
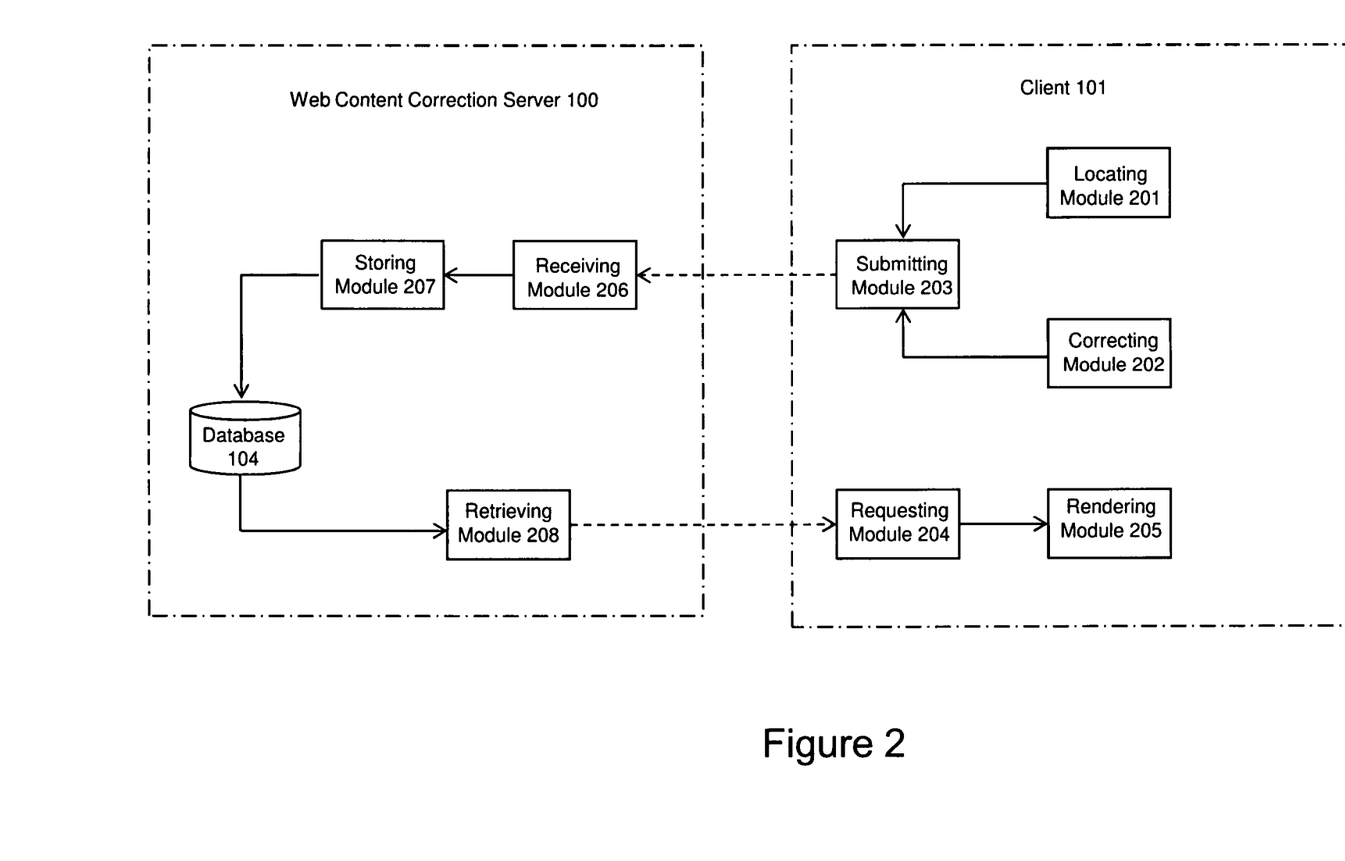
FIG. 2 illustrates an example high-level architecture of a web content correction system according to one embodiment of the present subject matter.

FIG. 2 illustrates an example high-level architecture of a web content correction system according to one embodiment of the present subject matter, wherein the major functional modules at the client side and at the correction server side are shown. As shown, the client 101 includes: a locating module 201, a correcting module 202, and a submitting module 203. The locating module 201 is used for, in response to a user's request for correcting an erroneous content in a web page, determining the location of the erroneous content in the web page. The correcting module 202 is used for receiving the user's input of correction content for the erroneous content. The submitting module 203 is used for submitting correction information to the correction server 100 that includes the location and the correction content. The client side 101 also includes a requesting module 204 and a rendering module 205. The requesting module 204 is used for, in response to a user's request for visiting a web page, requesting the correction service provider to retrieve the correction information associated with the web page, the correction information including the location of the erroneous content and the correction content. The rendering module 205 is used for rendering the web page to the user, wherein the correction content is displayed along with the erroneous content.

The correction server 100 includes a receiving module 206, a storing module 207, and a retrieving module 208. The receiving module 206 is used for receiving correction information submitted by a user for the erroneous content in a web page, the correction information including the location of the erroneous content and the correction content. The storing module 207 is used for storing the received correction information. The retrieving module 208 is used for retrieving the correction information and sending the same to a user in response to the user's request for visiting the web page.

Next, an example method according to a preferred embodiment of the present subject matter will be described in detail with reference to the accompanying drawings. The following description is based on the most popular open source code web browser-Mozilla Firefox®. However, those skilled in the art will appreciate that with suitable modification, the method of the present subject matter may also be implemented by other web browsers like Internet Explorer®, Opera®, etc.

According to the present example, the method for correcting the erroneous content in the web page includes two major stages: a stage of web content correction and a stage of rendering the corrected web content.

The Stage of Web Content Correction (First Stage)

Figure 3:
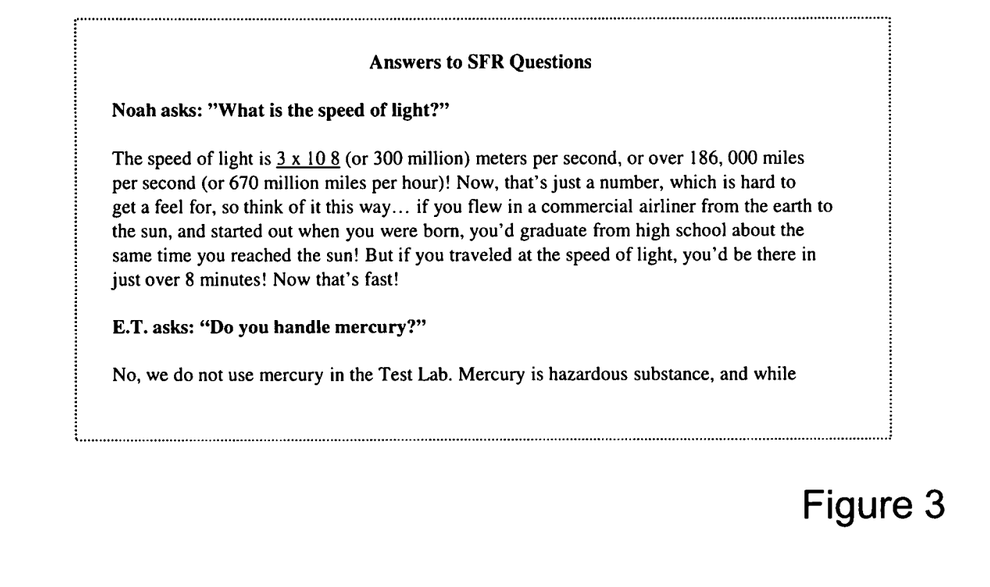
FIG. 3 illustrates an example of a web page that contains erroneous content according to one embodiment of the present subject matter.
Figure 4:
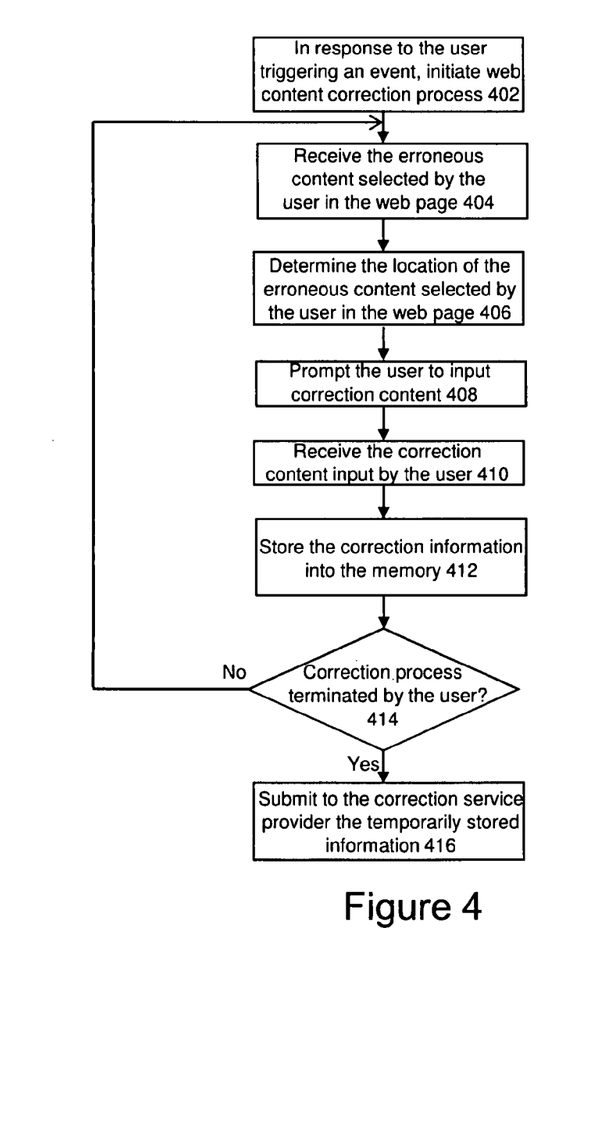
FIG. 4 illustrates a flow chart of example operations performed at the user side during the stage of web content correction according to one embodiment of the present subject matter.

Assume that User_a in FIG. 1 has the knowledge of the speed of light in a vacuum. User_a visits a web page as shown in FIG. 3 which contains information about the speed of light in the vacuum through the browser 105*a* on client 101*a*, and finds that the number "3 ×10 8" (underlined in the figure) in the page is erroneous. Then, User_a wants to correct the erroneous content so as to prevent it from misleading later visitors. To this end, the first stage of the web content correction method according to the example is performed to carry out the correction operations as shown in FIG. 4.

First, User_a triggers an event, for example, by clicking a button in a "Correction Plug-in" toolbar in the browser, or clicks a right button of the mouse to trigger a context menu item. In response to the triggering event, the plug-in initiates the web content correction process (step 402).

Next, the erroneous content selected by User_a in the web page is received (step 404). The user may select the erroneous content by pressing a left button of the mouse down at a starting position of the erroneous content, sliding over the whole erroneous content, and releasing the button of the mouse at an ending position of the erroneous content. For ease of illustration, text is used as an example of the erroneous content in the embodiment. However, those skilled in the art can understand that the erroneous content may be a more complex object, like an image. The processing for images is similar to text. By using the JavaScript function window.getSelection( ) provided by the Mozilla Firefox®, the current selection of erroneous content "3×10 8" by the User_a may be returned as a "Selection" object. At the same time, the correction plug-in monitors the selection of User_a, and determines the location of the erroneous content selected by User_a in the web page (step 406). The location information of the erroneous content selected by the user will be useful later in the rendering of the web page. The locating operation is implemented through Document Object Model (DOM) inspection.

Specifically, example pseudo code to obtain the selected erroneous content is listed in the LOCATE-SELECTED TEXT pseudo code below.

```
Selection LOCATE-SELECTED-TEXT(window)
1  curSel ← window.getSelection( )
2  if curSel.toString( ).length = 0
3     then
4         // Comment: selected text is enclosed in a frame?
5         curSel ← NIL
6         for each frame in window.frames
7             do curSel ← LOCATE-SELECTED-TEXT(frame)
8                 if curSel ≠ NIL
9                     then break
10 return curSel
```

The meaning of the above pseudo code is:
1. Obtain selection information by using window.getSelectiono function.
2. Return window.getSelection( ) if there is selected text.
3. Else if curSel.toString( ).length is zero, then it means that it is enclosed in a frame.
4. Obtain the selected text information through frame iteration.

Next, with respect to the user's selected erroneous content obtained above, its location information is obtained. In the present example, the absolute position of the selected erroneous content's enclosing extensible markup language (XML) element in the DOM tree is used as the recorded location information. Example pseudo code to get the location is listed in the DOM-INSPECTION pseudo code below.

```
DOM-INSPECTION(curSel)
1  range ← curSel.getRangeAt(0)
2  start ← range.startOffset
3  end ← range.endOffset
4  node ← range.commonAncestorContainer
5  if node.nodeType = Node.TEXT_NODE
6     then node ← node.parentNode
7  id ← NIL
8  name ← NIL
9  name_index ← 0
10 tagName ← NIL
11 tagName_index ← NIL
12 if node.id ≠ NIL
13    then id ← node.id
14    else
15        nm ← node.getAttribute("name")
16        if nm ≠ NIL
17            then
18                nds ← document.getElementsByName(nm)
19                i ← 0
20                for each nd in nds
21                    do
22                        if nd = node
23                            then
24                                name ← nm
25                                name_index ← i
26                                break
27                        i ← i+1
28            else
29                tagNm ← node.tagName
30                nds ← document.getElementsByTagName(tagNm)
31                i ← 0
32                for each nd in nds
33                    do
34                        if nd = node
35                            then
36                                tagName ← tagNm
37                                tagName_index ← i
38                                break
39                        i ← i+1
40 return (start, end, id, name, name_index, tagName, tagName_index)
```

The meaning of the above pseudo code is:
1. Check if the selected text belongs to a TEXT_NODE XML element: if true, set its parent node as the enclosing node element; otherwise, keep the current node as the enclosing node elements.

2. Check if the node has an id attribute: if true, its id attribute value is returned; otherwise, go to the next step.
3. Check if the node has a name attribute: if true, return the sequential number of current node in document.getElementsByName( ); otherwise, go to next step.
4. Get the node's tagName, and return the sequential number of current node in document. getElementsByTagName( ).

Example simplified HTML source of the web page containing erroneous content in FIG. 3 is shown below.

```
<html>
  <body>
    <table>
      <tbody>
        <tr>
          <td> Answers to SRF Questions </td>
        </tr>
        <tr>
          <td>
            <p><strong> Noah asks: "What is the speed of light?" </strong></p>
            <p> The speed of light is 3 × 10 8 (or 300 million) meters per second, or
            over 186,000 miles per second (or 670 million miles per hour)! Now,
            that's just a number, which is hard to get a feel for, so thing of it this
            way ... if you flew in a commercial airliner from the earth to the sun, and
            started out when you were born, you'd graduate from high school about
            the same time you reached the sun! But if you traveled at the speed of
            light, you'd be there in just over 8 minutes! Now that's fast!
            </p>
            <p><strong> E.T asks: "Do you handle mercury?"</strong></p>
            <p id = 'p12' name = 'p12'> No, we do not use mercury in the Test Lab.
            Mercury is a hazardous substance, and while it has numerous industrial
            uses, we do not utilize it in any of our processes or activities. In general
            we try to reduce the amounts and kinds of dangerous chemicals and
            substances that we use in performing our work, and will substitute a less
            hazardous material, even if it is more expensive, in order to reduce the
            risk to our staff, the public, and the environment.
            </p>
          </td>
        </tr>
      </tbody>
    </table>
  </body>
</html>
```

Figure 6:
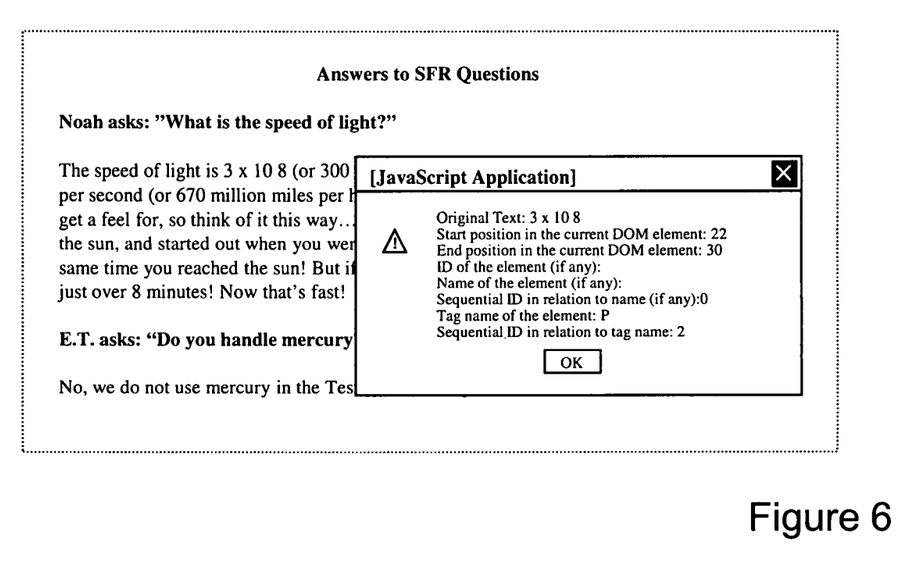
FIG. 6 illustrates an example result of running JavaScript pseudo code to locate erroneous content selected by the user according to one embodiment of the present subject matter.

In this example, "3×10 8" is selected by the user as the erroneous content. FIG. 6 illustrates the result of running the above JavaScript pseudo code to locate the selected erroneous content. Specifically, the XML element where the selected text is located is the second element with a tag name of P in the DOM tree, the starting position of the selected text in the element is 22, and the ending position is 30, with indexing beginning with zero for each element. The location of the selected text will be represented as P[1]->(22, 30) hereinafter.

Next, the plug-in for the example prompts a dialog box to ask the user to input correction content (step 408), and receives the correction content input by the user, which is "3×10 ^8" in this example (step 410).

The plug-in temporarily stores the information about the erroneous content (including the original erroneous content selected by the user and the location of the erroneous content identified) along with the user's input correction content into a memory (step 412). According to one possible implementation, the correction plug-in also stores a context signature of the erroneous content in step 412. This is performed in observation that, after a user corrected the erroneous content in a web page, the web page owner may have updated the page. In this case, the correction information previously submitted becomes invalid, and thus may not be rendered to later users who visit the web page. The context signature may be used to check whether the correction information is still valid during the rendering of the web page, which will be explained hereinafter. In the present example, a method is employed to generate the context signature: record a certain number of characters both before and after the erroneous content, for example, five characters before and after the erroneous content respectively. Therefore, in the present example, the recorded context signature is "t is" and "(or".

Since there may be more than one erroneous part to be corrected in the web page, in step 414, it is determined whether the user has terminated the correction process by, for example, clicking a "Submit" button in a correction plug-in toolbar. If the judgment result is "no", the operations of receiving and locating the erroneous content selected by the user, receiving the correction content input by the user, and storing the correction information in steps 404-412 will be repeated. If the judgment result in step 414 is "yes", that is, it is determined that the user has clicked the "Submit" button to terminate the correction process, the correction plug-in will submit the information including the erroneous content, the location of the erroneous content, the correction content, and the context signature along with other information temporarily stored in the memory to the web content correction service provider via network 102 in step 416. The other information includes the Unified Resource Locator (URL) of the web page. If the user has registered with the correction service provider, the other information may also include user's information like the name of the user (correction information provider), etc.

Figure 5:
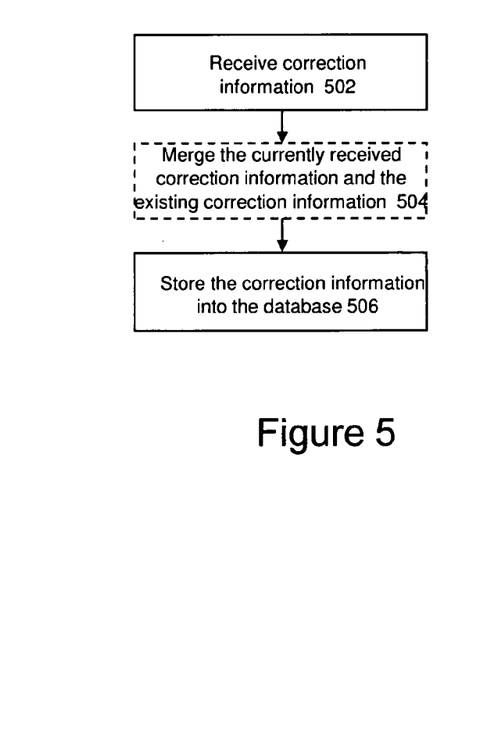
FIG. 5 illustrates a flow chart of example operations performed at the correction service provider side during the stage of web content correction according to one embodiment of the present subject matter.

FIG. 5 illustrates a flow chart of example operations performed at the correction service provider side during the stage of web content correction.

Correction server 100 receives correction information submitted from client 101a (user side) (step 502). Then, the received correction information along with other information, such as a timestamp and an IP address of the submitter (client 101a) is recorded in the database 104 as a record (step 506).

In practical use, there may be a situation where another user submitted correction information for the web page before. Therefore, there may be multiple correction records concerning the web page in the database. A method to address this situation is to directly insert the correction information currently submitted by the user into the database as a new record without processing, irrespective of whether there are already any correction records concerning the web page. When rendering the web page to the user later, all of the recorded correction information may be rendered to the user.

However, if there is too much repetitious correction information submitted by different users with respect to the same erroneous content, the above method may cause too much repetitious correction information to be rendered when rendering web page to the user. To solve this problem, according to the preferred embodiment, upon receiving the correction information currently submitted by a user, a merging module in the correction sever 100 merges the correction information and the similar records existing in the database (step 504).

On the other hand, if the correction information submitted by different users with respect to the same erroneous content cannot be merged according to the merging algorithm, then the correction information currently submitted by the user may be stored in the database. In this case, according to a preferred embodiment, an arbitration module is also provided in the correction server 100. The arbitration module ranks all the correction records stored in the database with respect to the same erroneous content, so that those records with higher ranks may be rendered to the user in a prominent manner during the stage of rendering a web page. The arbitration module may perform the ranking in conjunction with a voting mechanism explained in more detail hereinafter. Specifically, correction information which is accepted by a majority of the web users may thus be regarded as the most correct and given higher rankings.

The following Table 1 shows an example of correction records stored in the database 104 with respect to the above-mentioned example in step 506.

TABLE 1

The final records stored in the database

| Data field | Example | Remark |
|---|---|---|
| Unique correction ID | 550e8400-e296-41d4-a716-446655440000 | |
| Original text | 3 × 10 8 | |
| Correction text | 3 × 10^8 | |
| Location information | P[1]->(22, 30) | |
| Context signature | t is (or | Both five characters before and after erroneous text |
| Page URL | http://www.website.com/page.htm | |
| Correction provider | Jerry | Name or ID of the correction content provider (if registered), or anonymous |
| IP Tracking | 129.100.65.86 | Corrector's IP address (optional) |
| Timestamp | 2008-04-06 20:00:00 | |
| Agree votes | 100 | (optional) |
| Disagree votes | 15 | (optional) |
| Neutral votes | 15 | (optional) |

The stage of rendering the corrected web content (second stage)

Later, assume that another user, for example, User_b in FIG. 1, wants to know the speed of light in the vacuum. To this end, User_b requests to visit the web page shown in FIG. 3 through the browser on the client 101b. In this case, the second stage of the web content correction method of the present embodiment is performed to render the corrected web content to User_b.

Figure 7A:
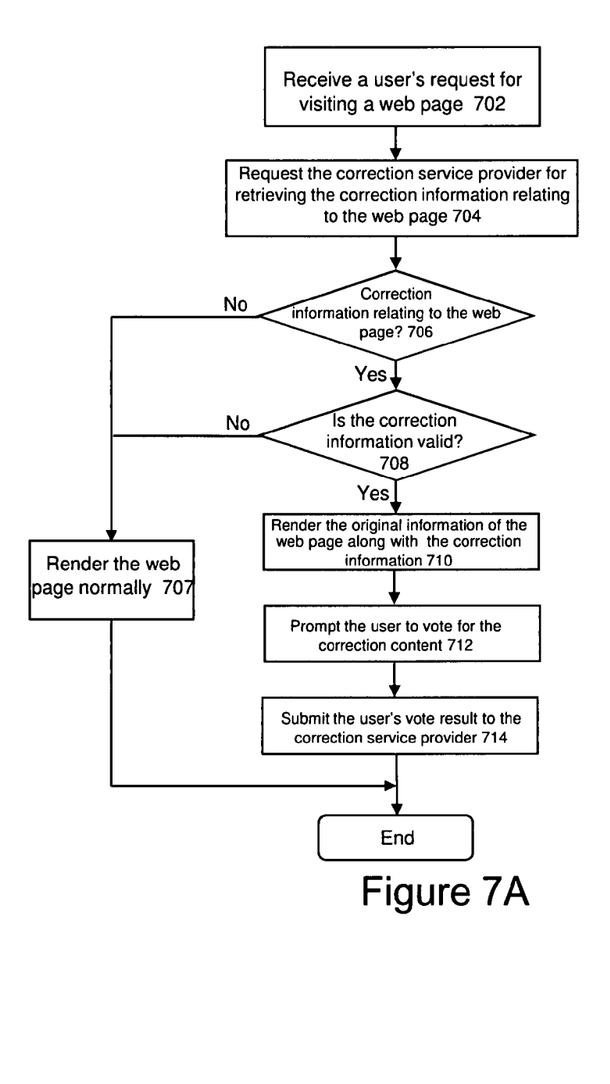
FIG. 7A illustrates a flow chart of example operations performed at the user side during the stage of rendering the corrected web content according to one embodiment of the present subject matter.
Figure 8A:
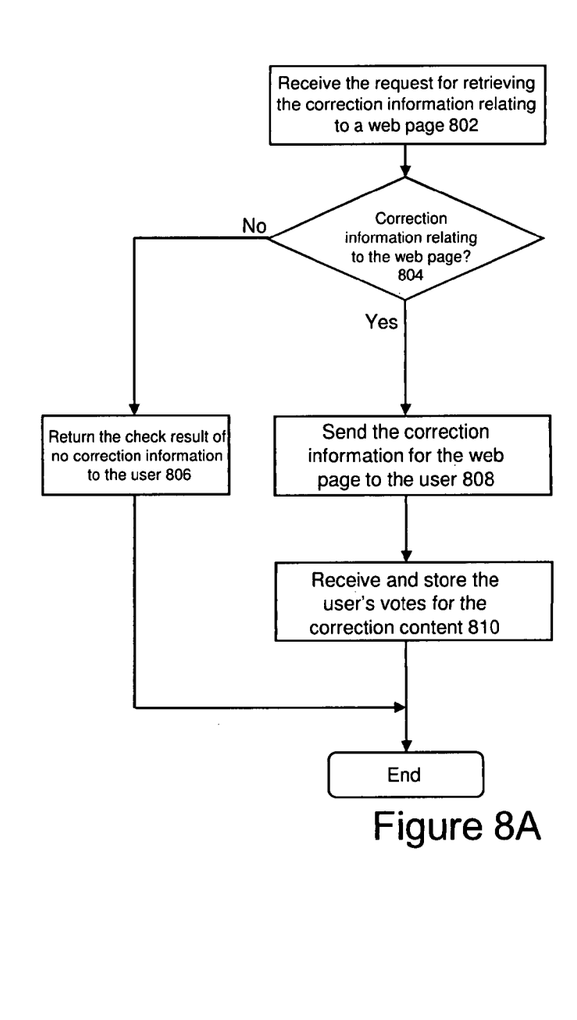
FIG. 8A illustrates a flow chart of example operations performed at the correction service provider side during the stage of rendering the corrected web content according to one embodiment of the present subject matter.

FIG. 7A illustrates a flow chart of example operations performed at the user side during the stage of rendering the corrected web content. FIG. 8A illustrates a flow chart of example operations performed at the correction service provider side during that stage.

First, as shown in FIG. 7A, the browser 105b receives a request made by User_b for visiting a web page (step 702). Next, a request is sent to the correction service provider to request retrieving the correction information about the web page (step 704).

The correction server 100, as shown in FIG. 8A, upon receiving the request for retrieving the correction information about the web page sent from the client 105b (step 802), checks in the database 104 to see if there is correction information about the web page (step 804). This can be done by comparing the URL of the web page with the URLs of web pages in the records stored in the database 104.

When it is determined that there is correction information relating to the web page (yes in step 804), the web page correction information including the location of the erroneous content and the correction content is sent to the user side (step 808). On the other hand, if it is determined that there is no correction information relating to the web page (no in step 804), then the check result of no correction information is returned to the user side (step 806).

Returning to FIG. 7A, in step 706, the browser in the client 101b performs further operations based on the check result returned from the correction server 100. If the returned check result shows that there is no correction information relating to the web page (no in step 706), the browser 105b does not make any change to the web page and renders the web page to User_b in a normal way (step 707). On the other hand, if the result is yes in step 706, i.e., there is correction information relating to the web page and the correction information is received from the service provider side, the browser 105b further checks if the correction information is valid (step 708). This can be done by using the context signature in the correction information. Specifically, the browser 105b compares the context signatures "t is" and "(or" with the characters currently in the same positions in the web page. If they do not conform to each other, then the web page is regarded as having been amended by the web content owner and thus the correction information is no longer valid. On the other hand, if they conform to each other, then the web page is regarded as not having been amended and thus the correction information is still valid.

Figure 9:
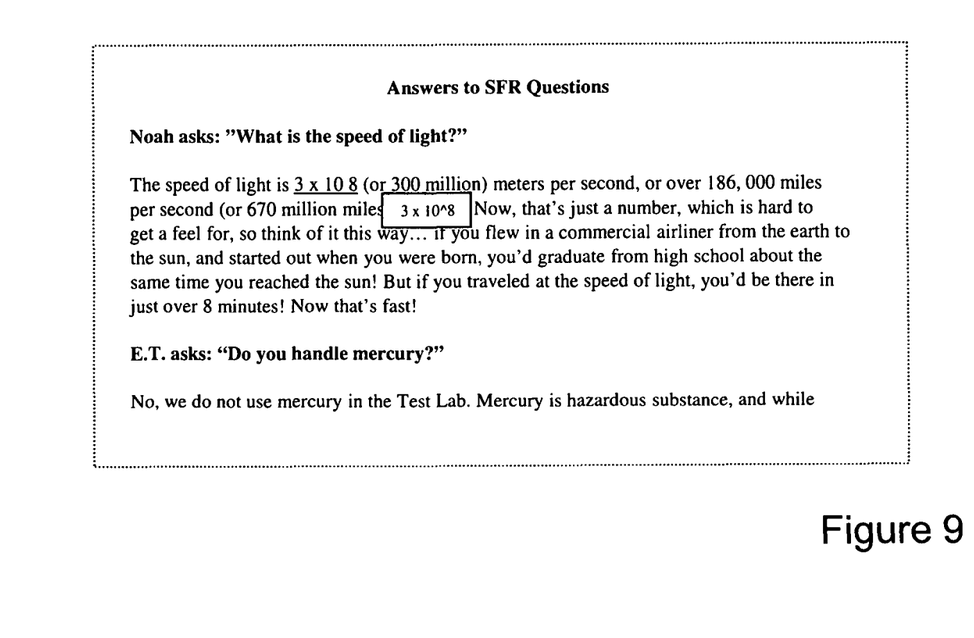
FIG. 9 illustrates an example of a web page rendered to the user that contains the correction content for the erroneous content according to one embodiment of the present subject matter.

If it is determined that the correction information is valid (yes in step 708), the original information and the correction information of the web page are rendered together (step 710). Preferably, the original information is displayed in a prominent manner by highlight or underlined, and the correction content is displayed near the erroneous content, as shown in FIG. 9.

Figure 7B:
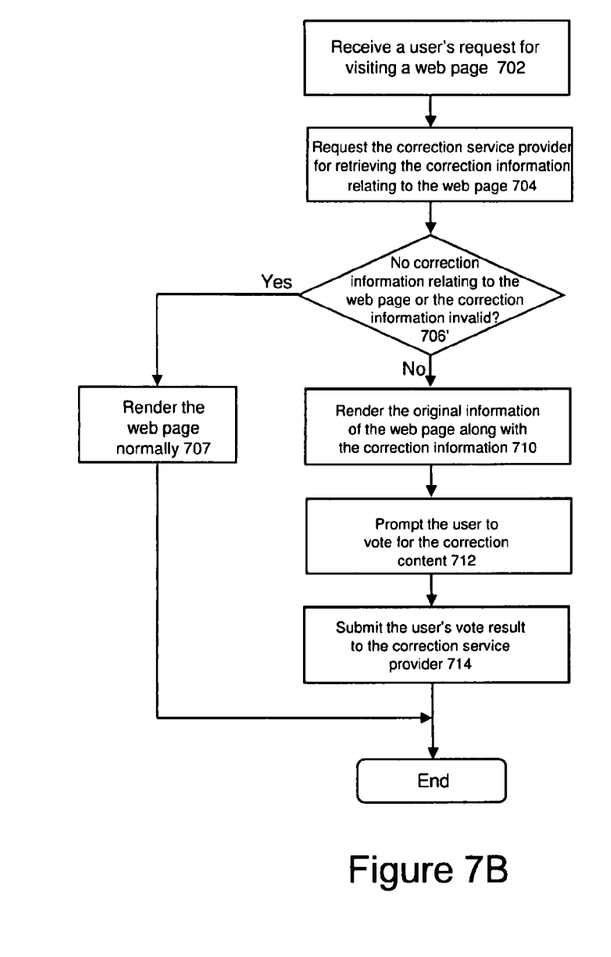
FIG. 7B illustrates a flow chart of example operations performed at the user side during the stage of rendering the corrected web content, according to another embodiment of the present subject matter.

According to an alternative embodiment, the validity of the correction information is checked at the correction service provider side. For this case, FIG. 7B and FIG. 8B respectively illustrate the flow chart of operations performed at the user side and the correction service provider side, wherein the same parts as those in FIGS. 7A and 8A are indicated by the same reference numbers and the descriptions thereof are omitted.

Figure 8B:
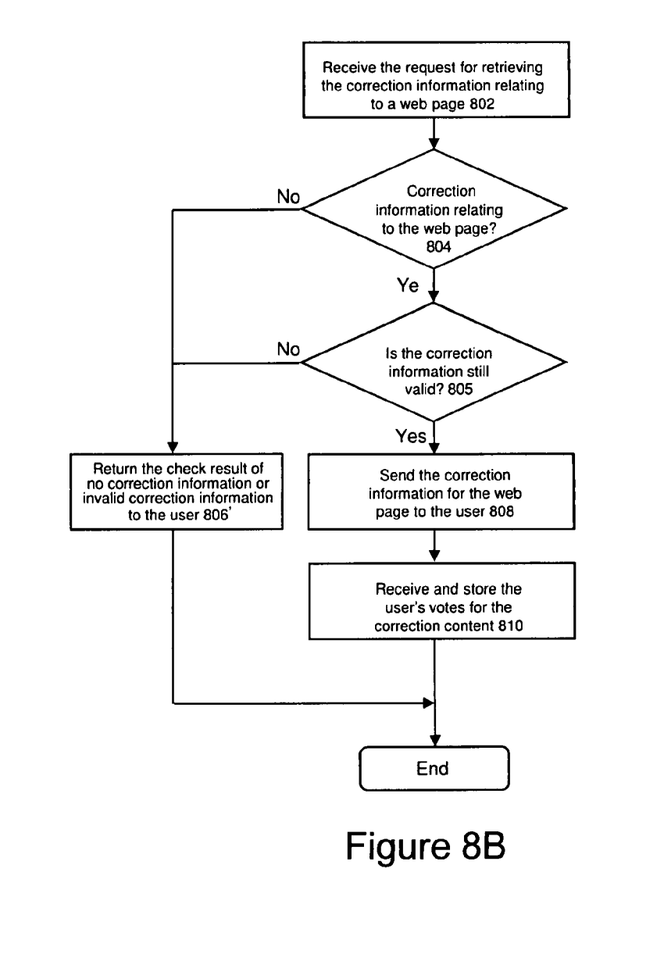
FIG. 8B illustrates a flow chart of example operations performed at the correction service provider side during the stage of rendering the corrected web content, according to another embodiment of the present subject matter.

When the correction server 100, as shown in FIG. 8B, determines that there is correction information relating to the web page (yes in step 804), it further checks if the correction information is still valid (step 805). If it is determined that the correction information is still valid (yes in step 805), the web page correction information including the location of the erroneous content and the correction content is sent to the user side (step 808). On the other hand, if it is determined that there is no correction information relating to the web page (no in step 804), or there is correction information relating to the web page but the correction information is no longer valid (no in step 805), then the corresponding check results are returned to the user (step 806).

Return to FIG. 7B, in step 706, the browser plug-in in the client 101b performs further operations based on the check result returned from the correction server 100. If the returned check result shows that there is no correction information relating to the web page or the correction information is invalid (yes in step 706'), the browser 105b does not make any change to the web page and renders the web page to User_b in a normal way (step 707). On the other hand, if the result is no in step 706, i.e., there is correction information relating to the web page and the correction information is valid, the browser 105b renders the original information of the web page along with the correction information, wherein the correction content is displayed near the erroneous content, as shown in FIG. 9.

According to a preferred embodiment, there is further provided a mechanism that enables the user browsing the web page to give feedback to the displayed correction content. Specifically, at the client side 101b, the browser plug-in may prompt a dialog box to ask the User_b to vote for the displayed correction content "3 ×10^8" (step 712 in FIGS. 7A and 7B). User_b for example may select "Agree," "Disagree," or "Neutral". Upon receiving the vote result, client 101b may submit the vote result to the correction service provider (step 714). Then, the operations of this stage are completed.

As shown in FIG. 8A, 8B, at the correction service provider side, the correction server 100 receives the vote result of User_b, and adds it to the previously received vote results and stores the added result into the database (step 810). Based on the feedback, an arbitration module in the correction server 100 may rank multiple correction contents submitted by different users for the same erroneous content. For example, the correction contents may be ranked by a percentage of agreeing votes, and the ranking result along with correction information may be returned to the client 101b. When client 101b renders to the user a plurality of correction contents for the same erroneous content, for example, a certain number of correction contents with higher ranks may be displayed, wherein the correction content with the highest rank may be displayed at the most prominent position. In addition, the vote result information for the correction content may be rendered to the user along with the correction content. Moreover, the correction sever 100 may set a threshold, so that when disagreeing votes for a correction content (or the percentage of the disagreeing votes, etc.) exceeds the threshold, the arbitration module may delete the correction content from the database.

Heretofore, the typical process of web content correction and rendering of corrected web content has been described. It may be seen that, a web user may implement the present subject matter by installing a plug-in in his/her browser. The user may directly mark the erroneous content on the web page without having to use graphical or text descriptive language to describe the location of the error. The user may also conveniently describe the correction content and submit correction information. In this way, the user may conveniently correct the erroneous contents on the web page in a uniform way. Once the correction information is submitted, other users browsing the web page may immediately see the correction content with almost no delay. Of course, the web user may also see the corrections made by other users to the erroneous contents on various web pages. In this manner, web content correction results more efficient and more objective than the self-correction of the website owners may be achieved without any change to the structure of the existing centralized websites.

According to a preferred embodiment, the correction service provider may provide the web content owner with error notification service. For example, upon receiving the correction information for a web page submitted by a user, the correction server 100 may notify the corresponding web content owner of the correction information. The correction server 100 may also generate statistics on the errors on the web page, and use the statistics as a criterion for ranking the quality/significance of the web page. For example, the more errors a web page contains, the less significant the web page may be regarded, and vice versa. On the other hand, in order to encourage users to correct the errors in the web pages, the correction service provider may award the user who has made the most valuable correction (for example, the correction getting most agree votes). As a result, a boosting circle forms among the web content correction service provider, the users, and the web content owners, and the errors on the web pages may be timely corrected.

The present subject matter has been described above with reference to the preferred embodiments. It should be noted that, the description of the preferred embodiment is only for illustration purposes and shall not be understood as limiting the present subject matter. For example, in the embodiment described above, the web content correction server 100 and the web content server 103 are shown at the web content correction service provider side and the web content owner side. However, those skilled in the art will appreciate based upon the present description that the present invention is not limited to this. The web content correction service provider itself may be a web content owner as well. For another example, although the embodiment is implemented through the Internet, the present subject matter may also be applied to enterprise intranets. Moreover, although the embodiment is described with reference to centralized websites, the present invention may also be applied to distributed websites. In fact, the users may correct the errors on various websites in a uniform way.

Moreover, the present subject matter may be embodied as a computer program product, and may be accessed from computer readable medium. The computer readable medium provides program code for use in conjunction with computers or any other instruction executing systems. The computer readable medium may be electronic, magnetic, optical, electromagnetic, infra and semiconductor devices. The specific examples of computer readable medium include semiconductor or solid memory, magnetic tape, removable disk, random access memory (RAM), read only memory (ROM), hard disk and optical disk. The current examples of optical disk include CD-ROM, CD-R/W, and DVD, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Those skilled in the art may make various modifications and changes without departing from the spirit and scope of the present invention. The protection scope of the present invention shall be defined by the claims appended.

The invention claimed is:

1. A method, comprising:
   determining, at a web client device, a location of user-identified erroneous content in a web page that is un-editable by a user in response to a request from the user to correct the user-identified erroneous content in the web page;
   generating, from within content of the web page in further response to the user's request, a context signature of the user-identified erroneous content that comprises a recorded specified number of characters of text from the web page both before and after the user-identified erroneous content;
   receiving, via an input/output (I/O) device, the user's input of user-submitted correction content for the user-identified erroneous content; and
   submitting, via a network interface, correction information to a correction service provider device that performs web content correction services, where the correction information comprises the location of the user-identified erroneous content, the context signature of the user-identified erroneous content from within the web page content, and the user-submitted correction content.

2. The method of claim 1, where determining, at the web client device, the location of the user-identified erroneous content in the web page that is un-editable by the user further comprises inspecting a Document Object Model associated with the web page.

3. The method of claim 1, further comprising:
   in response to a user's request for visiting the web page, requesting the correction service provider to retrieve the correction information associated with the web page that comprises the location of the user-identified erroneous content, the context signature of the user-identified erroneous content from within the web page content, and the user-submitted correction content; and
   rendering, via a display, the web page to the user, where the user-submitted correction content is displayed along with the user-identified erroneous content.

4. The method of claim 3, further comprising submitting, via the network interface, to the correction service provider user feedback information associated with the user-submitted correction content in response to rendering the web page to the user.

5. The method of claim 1, further comprising, in response to submitting, via the network interface, the correction information to the correction service provider, determining whether the correction information is valid.

6. The method of claim 5, where determining whether the correction information is valid further comprises determining whether the correction information is valid based upon the context signature of the user-identified erroneous content.

7. A device, comprising:
   an input/output (I/O) device; and
   a processor programmed to:
      determine a location of user-identified erroneous content in a web page that is un-editable by a user in response to a request from the user to correct the user-identified erroneous content in the web page;
      generate, from within content of the web page in further response to the user's request, a context signature of the user-identified erroneous content that comprises a recorded specified number of characters of text from the web page both before and after the user-identified erroneous content;
      receive via the I/O device the user's input of user-submitted correction content for the user-identified erroneous content; and
      submit correction information to a correction service provider device that performs web content correction services, where the correction information comprises the location of the user-identified erroneous content, the context signature of the user-identified erroneous content from within the web page content, and the user-submitted correction content.

8. The device of claim 7, where, in being programmed to determine the location of the user-identified erroneous content in the web page that is un-editable by the user, the processor is programmed to inspect a Document Object Model associated with the web page.

9. The device of claim 7, where the processor is further programmed to:
   in response to a user's request for visiting the web page, request the correction service provider to retrieve the correction information associated with the web page that comprises the location of the user-identified erroneous content, the context signature of the user-identified erroneous content from within the web page content, and the user-submitted correction content; and
   render the web page to the user, where the user-submitted correction content is displayed along with the user-identified erroneous content.

10. The device of claim 9, where the processor is further programmed to:
    submit to the correction service provider user feedback information associated with the user-submitted correction content in response to rendering the web page to the user.

11. The device of claim 7, where the processor is further programmed to:
    in response to submitting the correction information to the correction service provider, determine whether the correction information is valid.

12. The device of claim 11, where, in being programmed to determine whether the correction information is valid, the processor is programmed to determine whether the correction information is valid based upon the context signature of the user-identified erroneous content.

13. A method, comprising:
- receiving, at a web content correction server, correction information submitted by a user for user-identified erroneous content in a web page that is un-editable by the user, the correction information comprising a location of the user-identified erroneous content, a context signature of the user-identified erroneous content from within content of the web page, and user-submitted correction content submitted by the user to correct the user-identified erroneous content, where the context signature comprises a recorded specified number of characters of text from the web page both before and after the user-identified erroneous content;
- storing, within a memory, the received correction information; and
- retrieving the correction information from the memory and sending the correction information to the user, via a network interface, in response to a user's request for visiting the web page.

14. The method of claim 13, where storing, within the memory, the received correction information further comprises merging the user-submitted correction content with existing additional user-submitted correction content previously stored within the memory.

15. The method of claim 13, further comprising receiving, via the network interface, user feedback information associated with the user-submitted correction content.

16. The method of claim 15, further comprising ranking the user-submitted correction content based upon the user feedback information.

17. The method of claim 13, further comprising, in response to retrieving the correction information from the memory, determining whether the correction information is valid.

18. The method of claim 17, where determining whether the correction information is valid further comprises determining whether the correction information is valid based upon the context signature of the user-identified erroneous content.

19. An apparatus, comprising:
- an input/output (I/O) device; and
- a processor programmed to:
    - receive via the I/O device correction information submitted by a user for user-identified erroneous content in a web page that is un-editable by the user, the correction information comprising a location of the user-identified erroneous content, a context signature of the user-identified erroneous content from within content of the web page, and user-submitted correction content submitted by the user to correct the user-identified erroneous content, where the context signature comprises a recorded specified number of characters of text from the web page both before and after the user-identified erroneous content;
    - store the received correction information; and
    - retrieve the correction information and send the correction information to the user in response to a user's request for visiting the web page.

20. The apparatus of claim 19, where, in being programmed to store the received correction information, the processor is programmed to merge the user-submitted correction content with existing additional user-submitted correction content previously stored.

21. The apparatus of claim 19, where the processor is further programmed to receive user feedback information associated with the user-submitted correction content.

22. The apparatus of claim 21, where the processor is further programmed to rank the user-submitted correction content based upon the user feedback information.

23. The apparatus of claim 19, where the processor is further programmed to, in response to retrieving the correction information, determine whether the correction information is valid.

24. The apparatus of claim 23, where, in being programmed to determine whether the correction information is valid, the processor is programmed to determine whether the correction information is valid based upon the context signature of the user-identified erroneous content.

* * * * *